(12) United States Patent
Stegemoeller (10) Patent No.: US 9,751,575 B2
(45) Date of Patent: Sep. 5, 2017

(54) SELF-ALIGNING TRAILER

(71) Applicant: Halliburton Energy Services, Inc., Houston, TX (US)

(72) Inventor: Calvin L. Stegemoeller, Duncan, OK (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 15/033,861

(22) PCT Filed: Dec. 4, 2013

(86) PCT No.: PCT/US2013/073108
§ 371 (c)(1),
(2) Date: May 2, 2016

(87) PCT Pub. No.: WO2015/084341
PCT Pub. Date: Jun. 11, 2015

(65) Prior Publication Data
US 2016/0280291 A1 Sep. 29, 2016

(51) Int. Cl.
*B62D 53/08* (2006.01)
*B60D 1/01* (2006.01)
*B60D 1/14* (2006.01)
*B60D 1/24* (2006.01)

(52) U.S. Cl.
CPC ......... *B62D 53/0842* (2013.01); *B60D 1/015* (2013.01); *B60D 1/143* (2013.01); *B60D 1/245* (2013.01)

(58) Field of Classification Search
CPC .... B62D 53/0842; B60D 1/015; B60D 1/143; B60D 1/245

USPC ....................................................... 280/438.1
See application file for complete search history.

(56) References Cited

U.S. PATENT DOCUMENTS

| | | | | |
|---|---|---|---|---|
| 2,822,945 | A | * | 2/1958 | Duffy ................... B62D 53/065 280/425.2 |
| 2,988,383 | A | * | 6/1961 | Carson ................... B62D 53/08 280/479.2 |
| 3,041,087 | A | * | 6/1962 | Talbert ................ B62D 53/065 280/425.2 |
| 3,645,559 | A | * | 2/1972 | Stafford, Jr. ......... B62D 53/065 280/418.1 |
| 3,891,238 | A | * | 6/1975 | Ehlert ................ B62D 53/0828 280/446.1 |
| 4,125,272 | A | | 11/1978 | Putnam, Jr. et al. |
| 4,134,602 | A | | 1/1979 | Boger |
| 4,420,169 | A | * | 12/1983 | Taylor ..................... B60D 1/06 280/446.1 |

(Continued)

OTHER PUBLICATIONS

International Search Report and Written Opinion of the International Searching Authority dated Sep. 2, 2014, filed in related application PCT/US2013/073108.

*Primary Examiner* — Joseph Rocca
*Assistant Examiner* — Michael Stabley
(74) *Attorney, Agent, or Firm* — McAfee & Taft A Professional Corporation (57) ABSTRACT

A trailer hitch assembly and method characterized by having a hitch arm pivotally attached to a trailer such that when the hitch arm is placed in an unlocked position the hitch arm can pivot and when the hitch arm is placed in a locked position it is prevented from rotating.

14 Claims, 7 Drawing Sheets

(56) References Cited

U.S. PATENT DOCUMENTS

| | | | |
|---|---|---|---|
| 4,951,957 A * | 8/1990 | Gullickson | B60D 1/40 280/479.2 |
| 5,011,176 A | 4/1991 | Eppinette | |
| 6,109,641 A | 8/2000 | Guy | |
| 6,565,108 B1 * | 5/2003 | Gearhart | B62D 53/0878 280/432 |
| 6,964,427 B2 | 11/2005 | Chumley | |
| 8,925,954 B2 * | 1/2015 | Williams, Jr. | B60D 1/01 280/477 |

* cited by examiner

SELF-ALIGNING TRAILER

FIELD

This disclosure pertains to trailer hitches and more specifically to the trailer assembly portion of trailer hitches. The disclosure has particular applicability to fifth wheel trailer hitch systems.

BACKGROUND

Fifth wheel trailer hitch systems have long been used to connect towing trucks, tractor units or dollies to trailer portions of vehicle-trailer combinations. Commonly a fifth wheel trailer hitch system consists of a fifth wheel locking assembly, which is mounted on the vehicle, and a fifth wheel trailer pin assembly, which is mounted on the trailer.

Conventional fifth wheel trailer pin assemblies comprise a kingpin and skid plate, which are attached to the trailer. When the kingpin enters a jaw slot in the fifth wheel locking assembly the locking assembly firmly closes on the kingpin, thus mating the trailer pin assembly and the locking assembly into the complete fifth wheel trailer hitch system.

Vehicle-trailer combinations are routinely required to backup to a stationary platform to allow cargo to be loaded, unloaded or connected. As used herein, the term "stationary platform" means a platform or trailer or load that is fixed or not easily moveable relative to the vehicle-trailer combination and, hence, is stationary during the positioning of the vehicle-trailer combinations for loading, unloading or connection. Stationary platforms include, for example, loading docks, fixed loads, towers, freight elevators and similar.

Generally, it is desirable for the trailer to be aligned with the stationary platform to facilitate loading, unloading or connection. In some operations it is more critical that the alignment be precise, such as when remote loading or unloading mechanisms are employed. In either circumstance, achieving alignment with the stationary platform can be difficult with traditional fifth wheel trailer hitch systems and can require a high level of skill from the driver and/or require the driver to pull forward and reposition the trailer to the stationary platform multiple times. Accordingly, methods and apparatuses for facilitating the trailer alignment with a stationary platform are desirable.

BRIEF DESCRIPTION OF THE DRAWINGS

FIG. 2 is a cross-sectional view of a kingpin assembly in accordance with an embodiment. In FIG. 2, the fifth wheel lock assembly is shown schematically.

FIGS. 4A, 4B and 4C are top views of a vehicle-trailer combination employing a method in accordance with an embodiment. The figures represent the following views:

FIG. 4A: The view is during the initial backing of the vehicle-trailer combination while the kingpin assembly is in the lock mode;

FIG. 4B: The kingpin assembly is in the unlock mode and the view is after the initial backing and before alignment of the trailer with the stationary platform; and FIG. 4C: The kingpin assembly is in the unlock mode and the view is after alignment of the trailer with the stationary platform has been achieved.

DETAILED DESCRIPTION

In the description that follows, like parts are marked throughout the specification and drawings with the same reference numerals, respectively. The drawings are not necessarily to scale and the proportions of certain parts have been exaggerated to better illustrate details and features of the invention. Where components of relatively well-known designs are employed, their structure and operation will not be described in detail.

Figure 1:
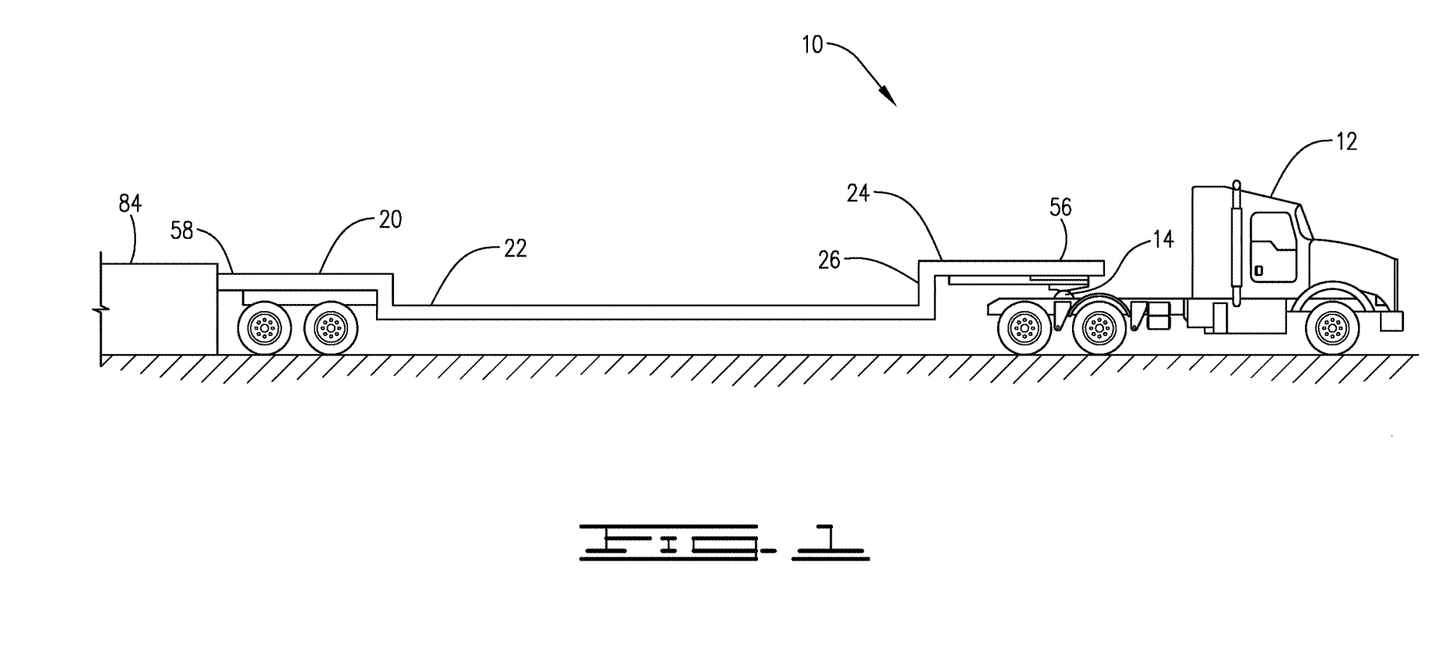
FIG. 1 shows a side view of a trailer and a truck employing one embodiment of the trailer hitch assembly.

Turning now to FIG. 1, a vehicle-trailer combination 10 is shown. The vehicle-trailer combination comprises a truck 12 and a trailer 20. Although shown as truck 12, the vehicle could be any suitable vehicle for moving a trailer, such as a truck, tractor, dolly or similar. Truck 12 has a fifth wheel lock assembly 14, which is of the type having a top plate 16 and a kingpin lock 18 (as shown in FIG. 2).

Figure 2:
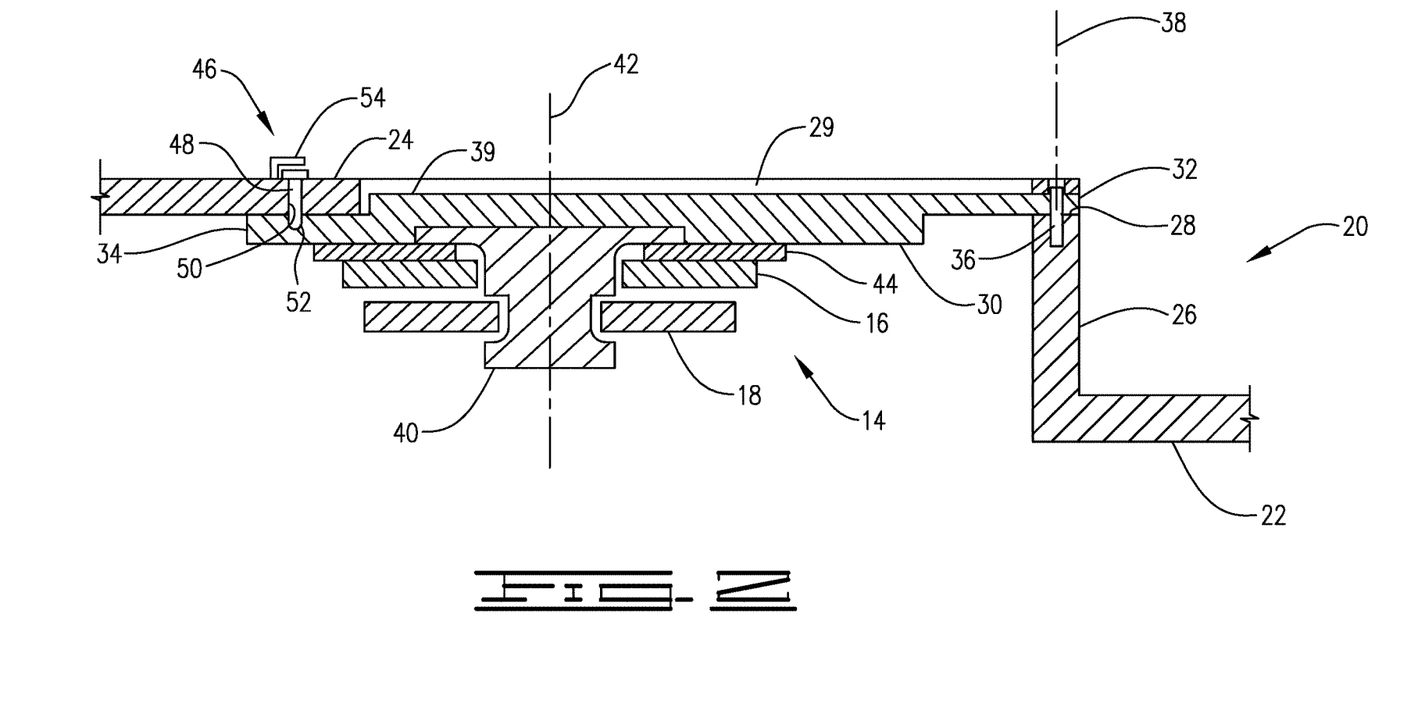
Figure 3:
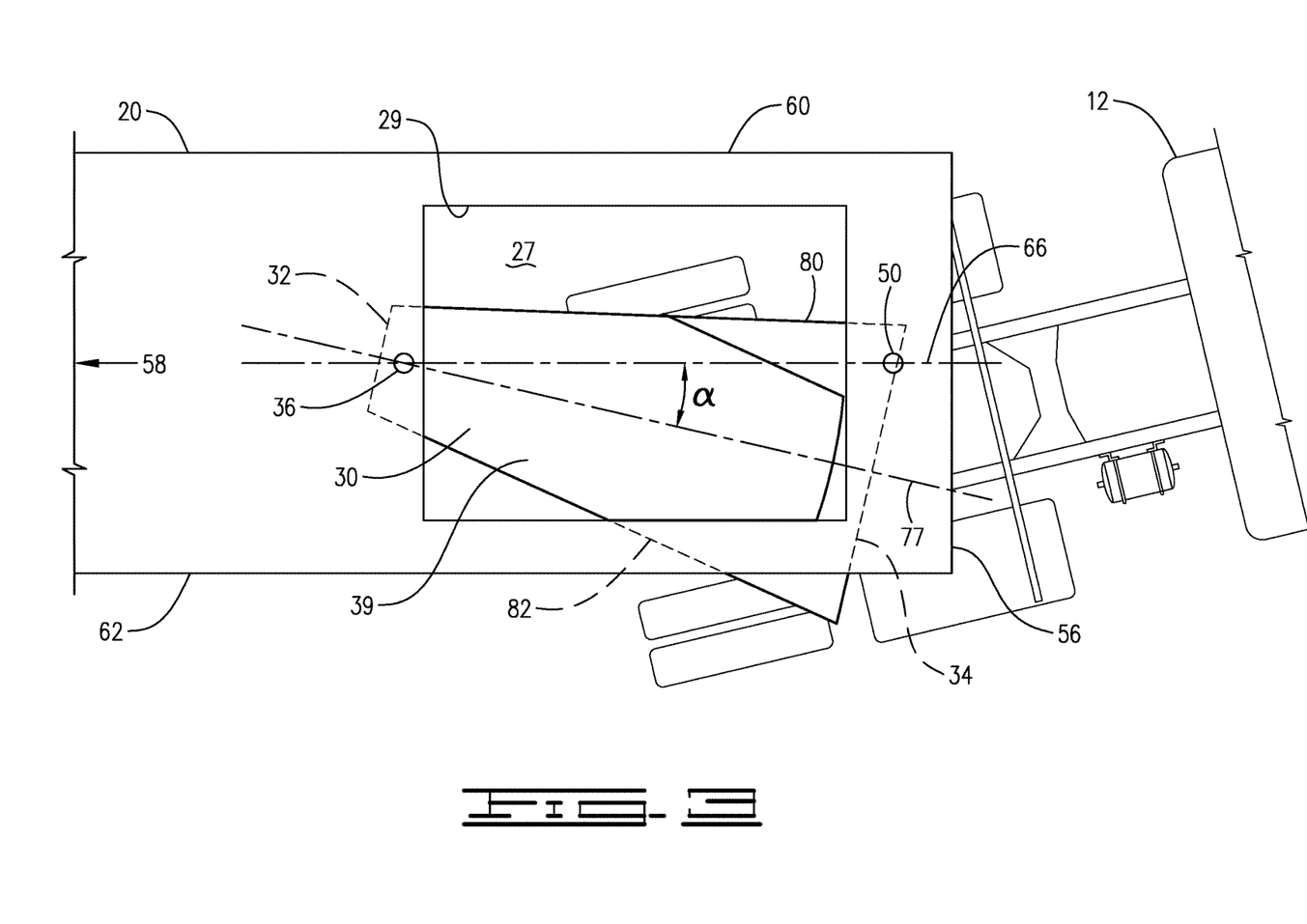
FIG. 3 is a top view of the area of a truck and trailer employing a fifth wheel trailer hitch system in accordance with the embodiment of FIG. 2.

With reference to FIGS. 1, 2 and 3, trailer 20 has a load deck 22 and a raised mounting deck 24, which are connected by vertical member 26. Mounting deck 24 is adapted to have a pivotal hitch arm connected thereto, shown as kingpin plate 30. Kingpin plate 30 has first end 32 and a second end 34. First end 32 is pivotally connected to mounting deck 24 such that second end 34 can swing through an arc relative to mounting deck 24. As shown, first end 32 is mounted within a slot 28 defined in vertical member 26. First end 32 of kingpin plate 30 is held within slot 28 by a pivot pin 36, which defines the pivot axis 38 for kingpin plate 30. Pivot axis 38 is vertical so that kingpin plate 30 has rotation confined to a horizontal plane about pivot axis 38.

Kingpin plate 30 can incorporate a rotation limiter, which is configured in FIG. 2 as a raised portion or section 39 on kingpin plate 30. The rotation limiter restricts the range of the arc that the kingpin plate can rotate. Raised section 39 extends into an orifice 27 defined by inside wall 29 in mounting deck 24 and fits in the orifice such that the pivoting of the kingpin plate is limited by the interaction of the raised section and inside wall 29 of the orifice 27. It will be appreciated that the rotation limiter can also have other forms. For example, raised dowels can extend upward from kingplate 30 and limit rotation by interacting with inside wall 29. Also, it will be appreciated that, while orifice 27 is shown as extending through mounting deck 24, orifice 27 could extend only partially through mounting deck 24, thus, creating a hollow concave area in mounting deck 24 for receiving the raised section.

At or near second end 34 of kingpin plate 30 is hitch attachment element, shown as kingpin 40, which is configured to mate with fifth wheel lock assembly 14 and be locked in place by kingpin lock 18. Kingpin 40 is attached to kingpin plate 30 so as to be remote from first end 32. Generally, kingpin 40 will be at or near second end 34; that is, generally, kingpin 40 will be located at least midway between first end 32 and second end 34, and, typically, closer to second end 34. Kingpin 40 can be located at or adjacent to second end 34. The structure of kingpin 40 and fifth wheel lock assembly 14 can be in accordance with known fifth wheel trailer hitch systems. Typically, kingpin 40 will be pivotally locked in a mating relation with fifth wheel lock assembly 14 such that the kingpin can rotate about a vertical axis 42. Kingpin 40 can be held in place by a skid plate 44 or by bolts (not shown). Skid plate 44 also can aid the introduction of kingpin 40 into fifth wheel lock assembly 14.

Also, at or near second end 34 is alignment lock 46. As shown, the alignment lock 46 can comprise an alignment pin 48, a first mating hole 50 in the mounting deck 24 and a second mating hole 52 in the kingpin plate 30 wherein the alignment pin 48 is received in first mating hole 50 and second mating hole 52. When so received, alignment pin 48 prevents kingpin plate 30 from pivoting and, hence, locks in the alignment of kingpin plate 30. Typically, kingpin plate 30 will be locked in alignment with the longitudinal axis of the trailer as further described below with reference to FIG. 3. Accordingly, alignment lock 46 has a locked position in which kingpin plate 30 is prevented from pivoting, and an unlocked position in which kingpin plate 30 is free to pivot about pivot axis 38. Also, alignment lock 46 can have a keeper 54 to prevent alignment pin 48 from being accidently or unintentionally removed. Keeper 54 can be configured to accept a padlock, or similar locking means, to prevent unauthorized removal of the pin. As will be appreciated, other configurations and variations for alignment lock 46 are within the scope of the invention.

Turning now to FIG. 3, the pivoting of kingpin plate 30 will be further described. As shown, trailer 20 has a longitudinal axis 66. As used herein, "longitudinal axis of the trailer" refers to longitudinal axis 66, which extends from the front 56 of the trailer 20 to the back or rear 58 of the trailer 20 and is laterally central to the trailer 20 (midway between first side 60 and second side 62). Additionally, kingpin plate 30 has a longitudinal axis 77. As used herein, "longitudinal axis of the kingpin plate" refers to longitudinal axis 77, which extends from the first end 32 of kingpin plate 30 to the second end 34 of the kingpin plate 30 and laterally central to the kingpin plate (midway between first side 80 and second side 82). When kingpin plate 30 is aligned along the longitudinal axis 66 of the trailer 20 (that is, when longitudinal axis 77 is aligned along longitudinal axis 66) the first mating hole 50 and the second mating hole 52 are aligned so that alignment pin 48 can be inserted thus placing the alignment lock 46 in the locked position and preventing rotation or pivoting of kingpin plate 30. When the alignment lock 46 is in the unlocked position, kingpin plate 30 is free to rotate such that longitudinal axis 77 can be at an angle $\alpha$ to longitudinal axis 66. If no rotational limiter is used, then kingpin plate 30 could pivot or rotate up to the limitation allowed by slot 28. Generally, this could be a maximum pivot or maximum rotation $\alpha_{max}$ of greater than 45 degrees and less than 90 degrees from the longitudinal axis of the trailer. Where $\alpha_{max}$ is the maximum angle $\alpha$ between longitudinal axis 77 and longitudinal axis 66. Typically, without a rotation limiter, the maximum pivot $\alpha_{max}$ would be greater than 60 degrees and less than 85 degrees from the longitudinal axis of the trailer. In some circumstances it is desirable to limit the maximum pivot of the kingpin plate 30 by using a rotation limiter; such as to prevent jackknifing and other safety hazards. By using the rotation limiter, the maximum pivot $\alpha_{max}$ can be limited to being less than 45 degrees from the longitudinal axis of the trailer. Generally with a rotation limiter, the maximum pivot $\alpha_{max}$ can be from about 10 degrees to about 30 degrees from the longitudinal axis of the trailer or can be from 15 degrees to 25 degrees from the longitudinal axis of the trailer.

Figure 4A:
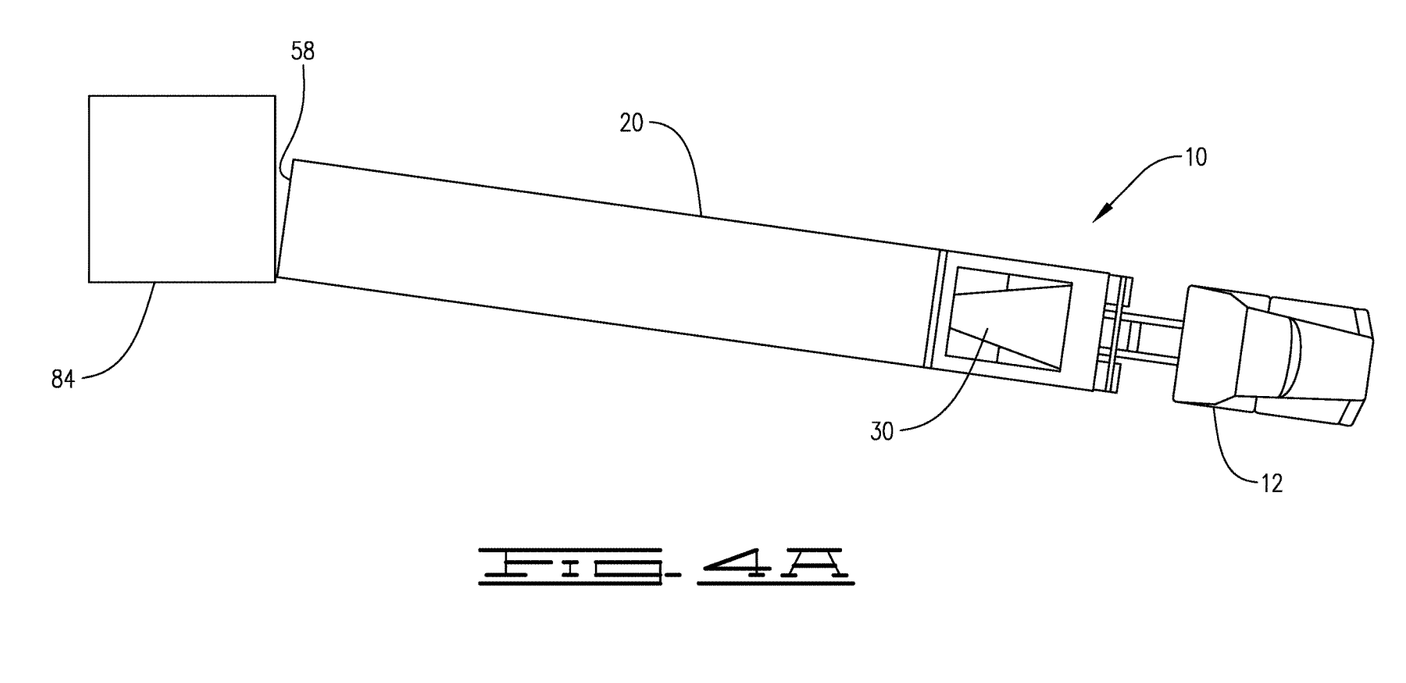
Figure 4B:
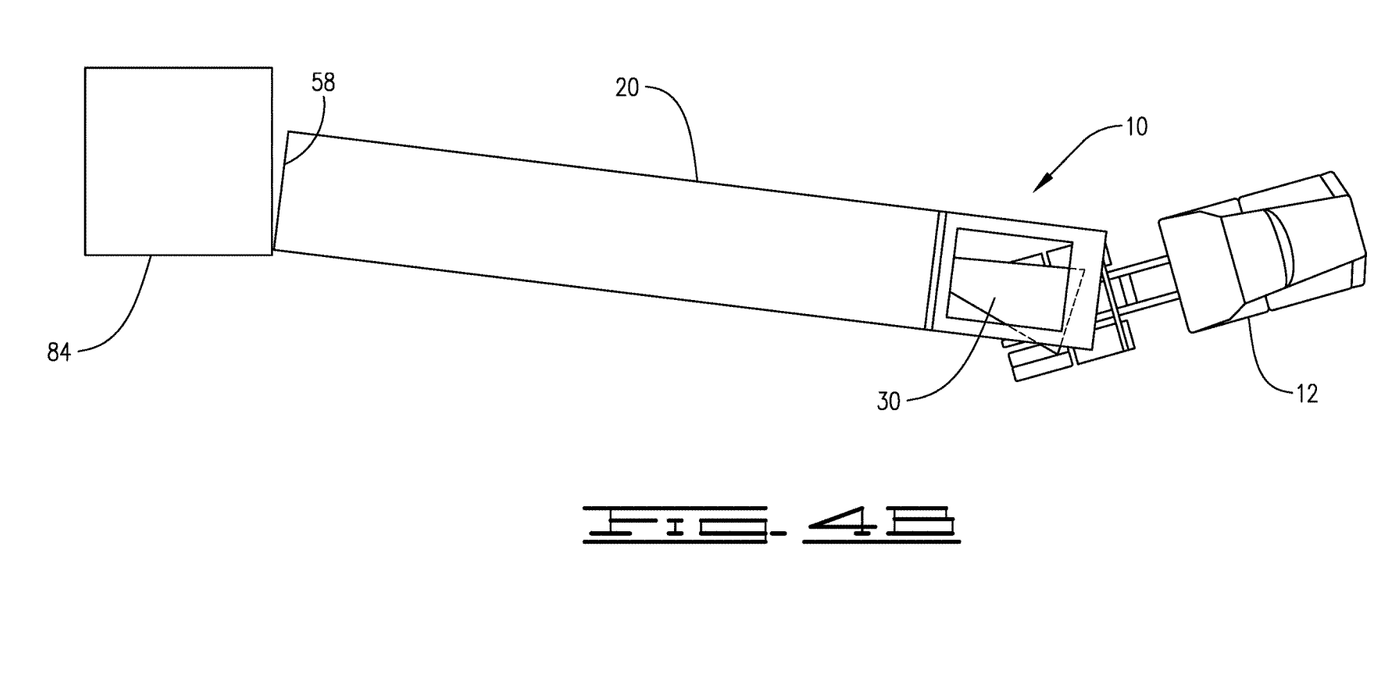
Figure 4C:
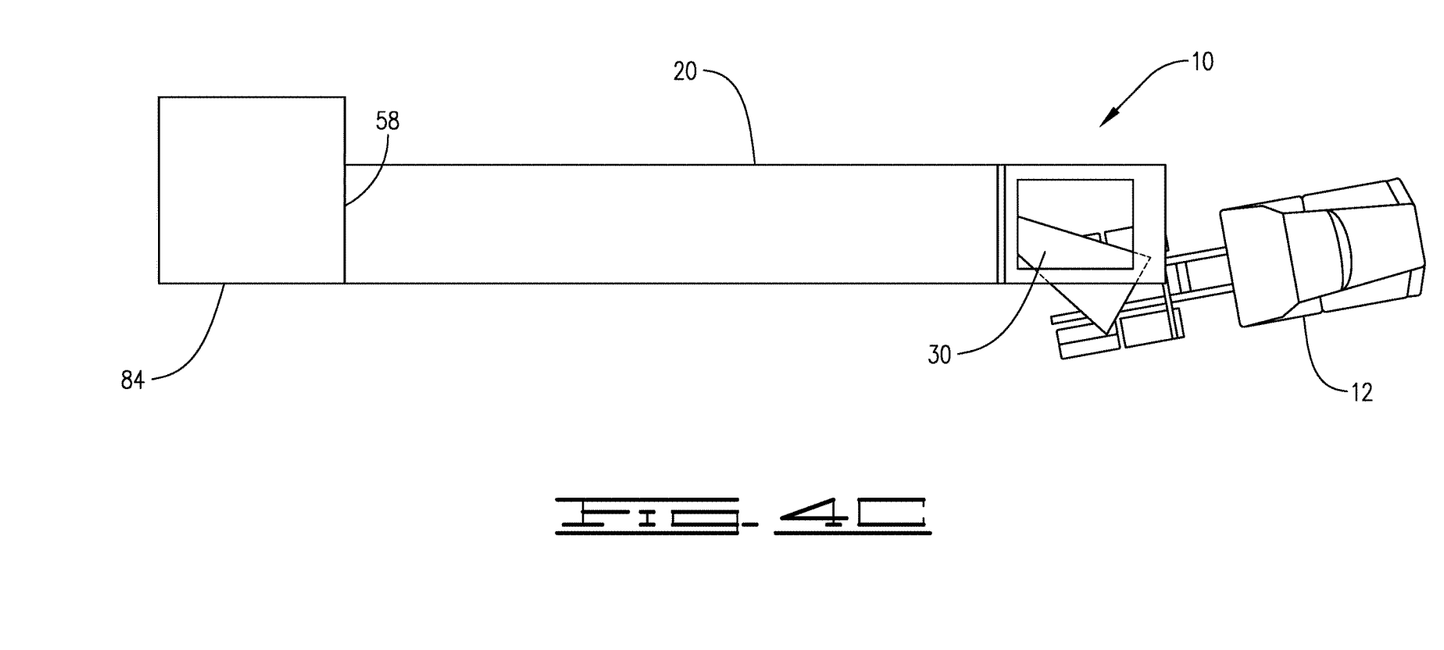

Turning now to FIGS. 4A, 4B and 4C, the operation of a trailer hitch assembly during the alignment of a trailer 20 with a stationary platform 84 will be described. When for loading or unloading purposes a precise alignment of back 58 of trailer 20 with a stationary platform is needed, the trailer hitch can be used for successful alignment. By "precise alignment" it is meant that the back 58 of the trailer will be mounted flush with the stationary platform, as shown in FIG. 4C, and not askew or at an angle, as shown in FIG. 4A. In performing the method of achieving precise alignment, the driver backs the vehicle-trailer combination 10 towards stationary platform 84 until the rear or back 58 of trailer 20 contacts stationary platform 84, as shown in FIG. 4A. During this initial backing, kingpin plate 30 is in a locked position such that it does not pivot. After contact is made, the driver stops backing and kingpin plate 30 is placed in the unlocked position such that kingpin plate 30 can pivot. The driver then resumes backing the vehicle-trailer combination 10 towards stationary platform 84 such that kingpin plate 30 starts to pivot, as shown in FIG. 4B. The driver continues backing up such that said kingpin plate further pivots thus causing the rear 58 of the trailer 20 to align with stationary platform 84, as shown in FIG. 4C. Vehicle-trailer combinations using traditional trailer hitch assemblies have had, at most, one pivot axis, such as axis 42 at the kingpin (see FIG. 2). One pivot axis or less makes precise alignment difficult and can require several forward and backward sequences to achieve precise alignment. When kingpin plate 30 is unlocked, there are two pivot axes, axis 42 at kingpin 40 and axis 38 at the first end 32 of kingpin plate 30 (see FIG. 2). The use of two pivot axes allows precise alignment with a single backing, as illustrated in FIGS. 4A, 4B and 4C. As can be seen in FIG. 4C, kingpin plate 30 has pivoted about axis 42 and pivoted about axis 38 when the trailer is moved into alignment with stationary platform 84. It will be appreciated that, without the pivot about axis 38, the rear 58 of trailer 20 would not be so aligned with stationary platform 84.

After trailer 20 has been aligned with stationary platform 84, trailer 20 is ready for loading or unloading. Once loaded or unloaded, the driver can move vehicle-trailer combination 10 forward thereby aligning kingpin plate 30 with longitudinal axis 66 of trailer 20. Next, kingpin plate 30 can be placed in the locked position and the vehicle-trailer combination is ready to be driven to another location.

Figure 5:
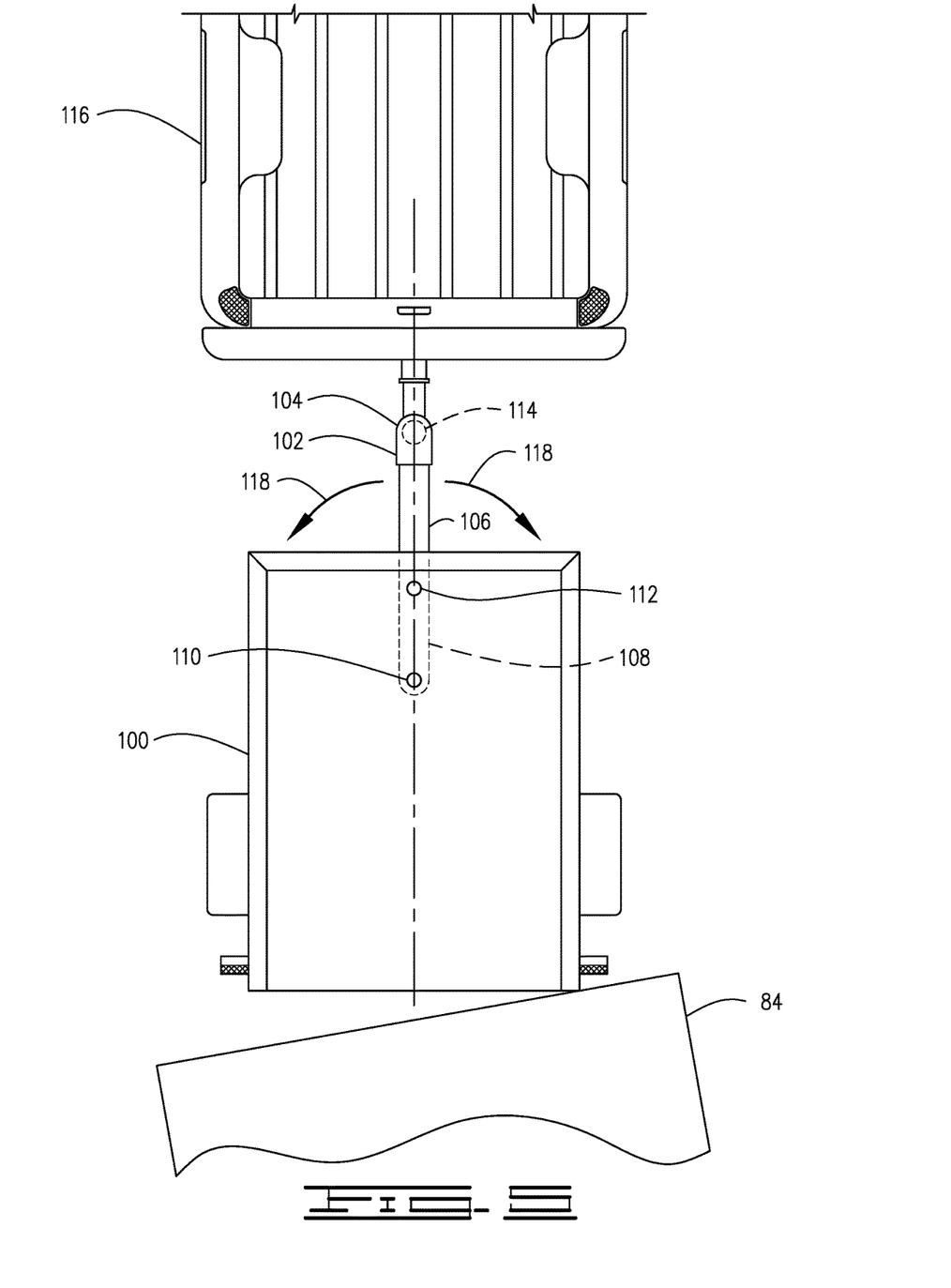
FIG. 5 is a top view of the area of a trailer employing a ball hitch system in accordance with an embodiment of the trailer hitch assembly.

Turning now to FIG. 5, another embodiment of a trailer hitch system is shown. Trailer 100 is configured to attach to a locking assembly, shown as ball hitch 114 on a truck 116. Accordingly, trailer 100 has a hitch attachment element 102 configured to attach to a ball hitch, as is known in the art. Hitch attachment 102 is mounted at a second end 104 of pivotal hitch arm 106. Pivotal hitch arm 106 is pivotally attached at a first end 108 to trailer 100 so that a vertical axis for the pivot extends through pivot pin 110. Accordingly, pivotal hitch arm 106 has rotation confined to a horizontal plane about pivot pin 110. Pivotal hitch arm 106 also has an alignment lock 112 which can be a locking pin mating with an aperture in pivotal hitch arm 106 and a corresponding aperture in trailer 100. When alignment lock 112 is disengaged or in an unlocked state, then pivotal hitch arm 106 is free to pivot about the first vertical pivot axis through pivot pin 110, as shown by arrows 118. Additionally, the pivotal hitch arm is free to pivot about a second vertical pivot axis at second end 104. The second vertical pivot axis is through the hitch attachment element 102 and aligned with the ball hitch 114 on truck 116. Accordingly when alignment lock 112 is disengaged, pivotal hitch arm 106 can pivot about two pivot points, one at first end 108 and one at second end 104. When alignment lock 112 is engaged or in a locked state, then pivot hitch arm 106 can only pivot about the second vertical pivot axis at second end 104.

In accordance with the above description several embodiments will now be described. In one embodiment a trailer hitch assembly comprises a hitch arm and a hitch attachment element. The hitch arm having a first end and a second end. The hitch arm is pivotally attached to a trailer at the first end. The hitch attachment element is attached to the hitch arm at or near the second end. The hitch attachment element can be configured to pivotally mate with a locking assembly on a vehicle. Further, the trailer hitch can have an alignment lock having a locked position in which the hitch arm is prevented from pivoting at the first end, and an unlocked position in which the hitch arm is free to pivot at the first end.

In another embodiment there is provided a trailer hitch assembly. The trailer hitch assembly comprises a kingpin plate having a first end and a second end. The kingpin plate is pivotally attached to a trailer at the first end. The trailer hitch further comprises a kingpin attached to the kingpin plate at or near the second end. The trailer hitch assembly can further comprise an alignment lock having a locked position in which the kingpin plate is prevented from pivoting and an unlocked position in which the kingpin plate is free to pivot.

In a further embodiment, the trailer can have a longitudinal axis and a mounting deck to which the king pin plate is pivotally attached. Additionally, the alignment lock can comprise an alignment pin, a first mating hole in the mounting deck and a second mating hole in the kingpin plate such that when the kingpin plate is aligned along the longitudinal axis of the trailer the first mating hole and the second mating hole align so that the alignment pin can be inserted, thus placing the alignment lock in the locked position. Also, the kingpin can be configured to pivotally mate with a fifth wheel locking assembly.

In another embodiment the trailer hitch assembly further comprising a rotation limiter configured to limit the pivoting of the kingpin plate. For example, the trailer can include a mounting deck having an inside wall defining an orifice in the mounting deck, and the kingpin plate can include a raised section fitting in the orifice such that the pivoting of the kingpin plate is limited by the interaction of the raised section and the inside wall. The rotation limiter can limit the maximum pivot to be from about 10 degrees to about 30 degrees from the longitudinal axis of the trailer or to be from 15 degrees to 25 degrees from the longitudinal axis.

In a further embodiment there is provided a hauling assembly including a trailer and vehicle. The trailer has a mounting deck to which a kingpin plate is pivotally attached. The kingpin plate has a first end and a second end. The kingpin plate is pivotally attached to the mounting deck at the first end. A kingpin is attached to the kingpin plate at or near the second end. The vehicle has a fifth wheel locking assembly for pivotally receiving the kingpin.

In yet another embodiment there is provided a method of aligning a trailer with a stationary platform wherein the trailer is connected to a vehicle. The method comprises the steps of:
(a) contacting a portion of the rear-end of a trailer with the stationary platform wherein the trailer has a pivotally attached hitch arm in a locked position such that it does not pivot relative to the trailer, and has a hitch attachment element attached to the plate, which is pivotally connected to a fifth wheel locking assembly on the vehicle to thus connect the trailer and vehicle;
(b) placing the hitch arm in an unlocked position such that the hitch arm can pivot relative to the trailer; and
(c) backing the vehicle towards the stationary platform such that the hitch arm pivots thus causing the rear of the trailer to align with the stationary platform.

The method can further comprise the steps of:
(d) after the trailer has been aligned with the stationary platform, aligning the hitch arm with a longitudinal axis of the trailer; and
(e) placing the hitch arm in the locked position.

Additionally, the method can further comprise restricting the amount of pivot for the hitch arm when the hitch arm is in the unlocked position. The amount of pivot can be restricted so that the maximum pivot of the hitch arm can be from about 10 degrees to about 30 degrees from the longitudinal axis of the trailer. Alternatively, the amount of pivot can be restricted so that the maximum pivot of the hitch arm can be from 15 degrees to 25 degrees from the longitudinal axis of the trailer.

In yet a further embodiment there is provided a method of aligning a trailer with a stationary platform wherein the trailer has a longitudinal axis and is connected to a vehicle, the method comprising:
(a) contacting a portion of the rear-end of a trailer with the stationary platform wherein the trailer has a pivotally attached kingpin plate in a locked position such that it does not pivot relative to the trailer, and has a kingpin attached to the plate, which is pivotally connected to a fifth wheel locking assembly on the vehicle to thus connect the trailer and the vehicle;
(b) placing the kingpin plate in an unlocked position such that the kingpin plate can pivot relative to the trailer;
(c) backing the vehicle towards the stationary platform such that the kingpin plate pivots thus causing the rear of the trailer to align with the stationary platform;
(d) restricting the amount of pivot for the kingpin plate when the kingpin plate is in the unlocked position so that the kingpin plate has a maximum pivot from 15 degrees to 25 degrees from the longitudinal axis of the trailer;
(e) after the trailer has been aligned with the stationary platform, aligning the kingpin plate with a longitudinal axis of the trailer; and
(f) placing the kingpin plate in the locked position.

Although the invention has been described with reference to a specific embodiment, the foregoing description is not intended to be construed in a limiting sense. Various modifications as well as alternative applications will be suggested to persons skilled in the art by the foregoing specification and illustrations. It is therefore contemplated that the appended claims will cover any such modifications, applications or embodiments as followed in the true scope of this invention.

What is claimed is:

1. A trailer hitch assembly comprising:
 a kingpin plate having a first end and a second end, wherein said kingpin plate is pivotally attached to a trailer at said first end;
 a rotation limiter configured to limit pivoting of the kingpin plate so as to define a maximum pivot for the kingpin plate relative to the trailer,
 a kingpin attached to said kingpin plate at or near said second end; and
 an alignment lock having a locked position in which said kingpin plate is prevented from pivoting at said first end and an unlocked position in which said kingpin plate is free to pivot at said first end.

2. The trailer hitch assembly of claim 1 wherein said kingpin is configured to pivotally mate with a locking assembly on a vehicle.

3. The trailer hitch assembly of claim 1 wherein said trailer has a longitudinal axis and a mounting deck to which said kingpin plate is pivotally attached, and wherein said alignment lock comprises an alignment pin, a first mating hole in said mounting deck and a second mating hole in said kingpin plate such that when said kingpin plate is aligned along said longitudinal axis of said trailer, said first mating hole and said second mating hole align so that said alignment pin can be inserted thus placing said alignment lock in said locked position.

4. The trailer hitch assembly of claim 1 wherein said kingpin is configured to pivotally mate with a fifth wheel locking assembly.

5. The trailer hitch assembly of claim 1 wherein said trailer includes a mounting deck having an inside wall defining an orifice in said mounting deck and said kingpin plate includes a raised section fitting in said orifice, wherein said inside wall and said raised section interact to form said rotation limiter such that the pivoting of said kingpin plate is limited by the interaction of said raised section and said inside wall.

6. The trailer hitch assembly of claim 5 wherein said trailer has a longitudinal axis and the maximum pivot of said kingpin plate is from 10 degrees to 30 degrees from said longitudinal axis of said trailer.

7. The trailer hitch assembly of claim 6 wherein the maximum pivot of said kingpin plate is from 15 degrees to 25 degrees from said longitudinal axis of the trailer.

8. The trailer hitch assembly of claim 7 wherein said kingpin is configured to pivotally mate with a fifth wheel.

9. A method of aligning a trailer with a stationary platform wherein the trailer has a front and a rear and is connected to a vehicle at said front, the method comprising:
(a) contacting a portion of said rear of said trailer with said stationary platform wherein said trailer has a pivotally attached hitch arm in a locked position such that it does not pivot relative to the trailer, and has a hitch attachment element attached to said hitch arm, which is pivotally connected to a locking assembly on said vehicle to thus connect said trailer and said vehicle;
(b) placing said hitch arm in an unlocked position such that said hitch arm can pivot relative to the trailer; and
(c) backing said vehicle towards said stationary platform such that said hitch arm pivots thus causing said rear of said trailer to align with said stationary platform.

10. The method of claim 9 further comprising:
(d) after said trailer has been aligned with said stationary platform, aligning said hitch arm with a longitudinal axis of said trailer; and
(e) placing said hitch arm in said locked position.

11. The method of claim 9 wherein, when in said unlocked position, said hitch arm pivots relative to the trailer by an amount of pivot and further comprising restricting the amount of pivot for said hitch arm when said hitch arm is in said unlocked position.

12. The method of claim 11 wherein said trailer has a longitudinal axis and the amount of pivot is restricted to provide for a maximum pivot of said hitch arm from 10 degrees to 30 degrees from said longitudinal axis of said trailer.

13. The method of claim 12 wherein the amount of pivot is restricted so that the maximum pivot of said hitch arm is from 15 degrees to 25 degrees from said longitudinal axis of the trailer.

14. A method of aligning a trailer with a stationary platform wherein said trailer has a front, a rear and a longitudinal axis and is connected to a vehicle at said front, the method comprising:
(a) contacting a portion of said rear of said trailer with said stationary platform wherein said trailer has a pivotally attached kingpin plate in a locked position such that it does not pivot relative to the trailer, and has a kingpin attached to said plate, which is pivotally connected to a fifth wheel locking assembly on said vehicle to thus connect said trailer and said vehicle;
(b) placing said kingpin plate in an unlocked position such that said kingpin plate can pivot relative to the trailer by an amount of pivot;
(c) backing said vehicle toward said stationary platform such that said kingpin plate pivots thus causing said rear of said trailer to align with said stationary platform;
(d) restricting the amount of pivot for said kingpin plate when said kingpin plate is in said unlocked position so that said kingpin plate has a maximum pivot from 15 degrees to 25 degrees from said longitudinal axis of said trailer;
(e) after said trailer has been aligned with said stationary platform, aligning said kingpin plate with a longitudinal axis of said trailer; and
(f) placing said kingpin plate in said locked position.

* * * * *